United States Patent
Lindner et al.

(10) Patent No.: US 6,559,999 B2
(45) Date of Patent: May 6, 2003

(54) SYSTEM FOR MODULATING RADIATION USING TWO ROTATING DISCS

(75) Inventors: Robert Lindner, Parsippany, NJ (US); Gerard DiTaranto, Parsippany, NJ (US); Michael Roselli, Nutley, NJ (US); Frank Vallese, Montville, NJ (US)

(73) Assignee: Electrophysics Corp., Fairfield, NY (US)

( * ) Notice: Subject to any disclaimer, the term of this patent is extended or adjusted under 35 U.S.C. 154(b) by 3 days.

(21) Appl. No.: 09/887,258

(22) Filed: Jun. 25, 2001

(65) Prior Publication Data

US 2002/0196515 A1 Dec. 26, 2002

(51) Int. Cl.[7] ............................................... G02B 26/02
(52) U.S. Cl. ........................ 359/233; 359/227; 359/230; 359/234; 250/227.21
(58) Field of Search ................................ 359/227, 230, 359/233–236; 250/227.21, 232–236

(56) References Cited

U.S. PATENT DOCUMENTS

| 4,165,919 A | 8/1979 | Little |
| 4,581,515 A | 4/1986 | Egashira |
| 4,640,580 A | 2/1987 | Schlesinger |
| 5,255,117 A | 10/1993 | Cushman |
| 5,615,497 A | 4/1997 | Meschan |

*Primary Examiner*—James Phan
(74) *Attorney, Agent, or Firm*—Hoffman, Wasson & Gitler, PC

(57) ABSTRACT

The present invention is directed to a system for modulating thermal infrared radiation for a pyroelectric imaging sensor or similar sensor by providing two discs rotating at the same speed, both discs provided adjacent to one another and between a source of radiation and a radiation sensor. Each of the discs is provided with a solid portion and an open portion. Changing the orientation of the solid portions of each the discs with respect to one another would change the sensitivity of the modulation device.

12 Claims, 4 Drawing Sheets

SYSTEM FOR MODULATING RADIATION USING TWO ROTATING DISCS

BACKGROUND OF THE INVENTION

1. Field of the Invention

The present invention is directed to an imaging sensor sensitive to thermal infrared radiation.

2. Description of the Prior Art

Current imaging systems need to obtain images from static, unchanging scenes. This is the case in most applications, not only in laser profiling. These types of systems require the modulation of the incoming radiation because the sensors, including pyroelectric arrays, only respond if the amount of radiation the sensors "see" in successive scans is different. If there is no change (or modulation of radiation) there is no response from the sensor.

This is generally accomplished by rotating a disc in front of the sensor. The disc provides an opening through which input scene radiation is allowed to pass into the sensor for the duration of a complete field of scanning. The remainder of the disc is solid and blocks all radiation for, again, the duration of a complete field of scanning. This provides the necessary difference between two successive scans in order to generate a useful image from the imaging sensor. A typical rotating disc 10 is shown in FIG. 1, provided with a darkened or closed portion 12, as well as an open portion 14. As shown in FIG. 1, the closed portion 12 generally constitutes half of the potential surface area of the rotating disc. However, the percentage of the darkened portion with respect to the opened portion can vary. The disc rotates in a synchronous manner such that, just after an open field of information is read from the imaging sensor, the solid or closed portion 12 of the disc covers that particular area of the sensor. This closing edge of the disc will continue to track the scanning of the imaging sensor for the duration of the entire field. Alternatively, the imaging sensor is re-scanned for each succeeding field of information that has been exposed only to the solid portion of the disc. When this occurs, the opening in the disc will soon arrive, restarting the two field cycle of one open-one closed field of information. This type of disc will provide the maximum sensitivity that the imaging sensor will have to offer.

Generally, any sensor is limited either by its damage threshold, or its useful dynamic range. Typical imaging systems involve the use of an objective lens. These lenses most often also have a variable aperture, namely, an iris. This iris will perform the function of increasing the dynamic range of an imager by decreasing the effective aperture of the lens in use, rather than the unwieldy changing to a lens of smaller aperture.

The laser industry calls for the use of an unobstructed path to an imaging sensor that will handle the laser's full operating power. Laser information itself is collimated, thereby not requiring an objective lens. This means that an iris is not even an available option for this application. In addition, the imaging system desired cannot use neutral density filters (NDF's) to reduce the radiation seen by the imaging sensor.

Prior art optical filters or choppers have been described in various U.S. patents, such as U.S. Pat. Nos. 4,165,919, issued to Little; 4,640,580, issued to Schlesinger; 5,255,117, issued to Cushman; and 4,581,515, issued to Egashira.

The patent to Little describes an adjustable optical filter provided with two filter wheel discs. The filter merely acts as an optical iris in that changing the relative position of one of two filter wheels with respect to the second wheel, changes the amount of sunlight that passes through a net opening. This net opening is related to the size of the open area remaining from the two wheels. These filter wheels do not need to spin, nor is there rotation in synchronism with any detector assembly noted. In addition, the patent describes use of a filter material, such as Mylar to help reduce maximum radiation.

The Schlesinger patent discloses the use of two rotating chopper wheels. These wheels are not located close to one another with each wheel required to be located on one side of a focal plane. Therefore, these wheels cannot be synchronized with a detector read-out or changed in phase or the amount of overlap. The purpose of this invention is to produce focus dither in an optical system.

The patent to Cushman discloses an advanced eye or sensor protection in a high-speed variable optical continuation system. This system includes protective shutters 14 and 16 shown in FIGS. 2 and 3. However, these shutters are not designed to be synchronized with one another to produce or to control the sensitivity of the system.

The patent to Egashira discloses a means for producing laser beam modulation by using rotating discs as choppers. The distribution of power density of the laser beam is altered by opening and closing a passage for the laser beam. Rotatable chopping disc 53, 55, 57 and 59 having circular holes are provided.

None of these patents are directed to a system for increasing the range of radiation illumination that a sensor can be subjected to, without the use of irises or NDF's, or providing a maximum sensitivity.

SUMMARY OF THE INVENTION

The deficiencies of the prior art are overcome by the present invention which is directed to a system for modulating thermal infrared radiation for an imaging sensor. The system increases the range of radiation illumination that a sensor can be subjected to without using irises or NDF's. Two parallel discs are provided and are disposed in between a radiation source and the sensor. Each disc has an opening which, in the illustrated embodiment, is approximately ½ the disc. Maximum sensitivity occurs when the openings in the two discs coincide, as the two discs rotate in synchronization with the scanning format of the imaging sensor. To reduce sensitivity, one disc is offset from the second disc so that its opening does not totally coincide with the opening of the second disc when both discs rotate at the same speed, thereby decreasing the total open area and reducing the amount of radiation received by the sensor. The amount of radiation can be varied from 50/50 to 1/99, or an infinitesimal fraction to provide a large dynamic range of input, thereby enhancing laser beam profiling. Systems that perform this function by adjusting the lens iris are more expensive and more dependent on the specific objective lens used. Systems that perform this function by adding neutral density filters are equally cumbersome to implement. These and other aspects of the present invention will become apparent to those skilled in the art after reading the following description of the preferred embodiments when considered with the drawings.

DETAILED DESCRIPTION OF THE INVENTION

Figure 1:
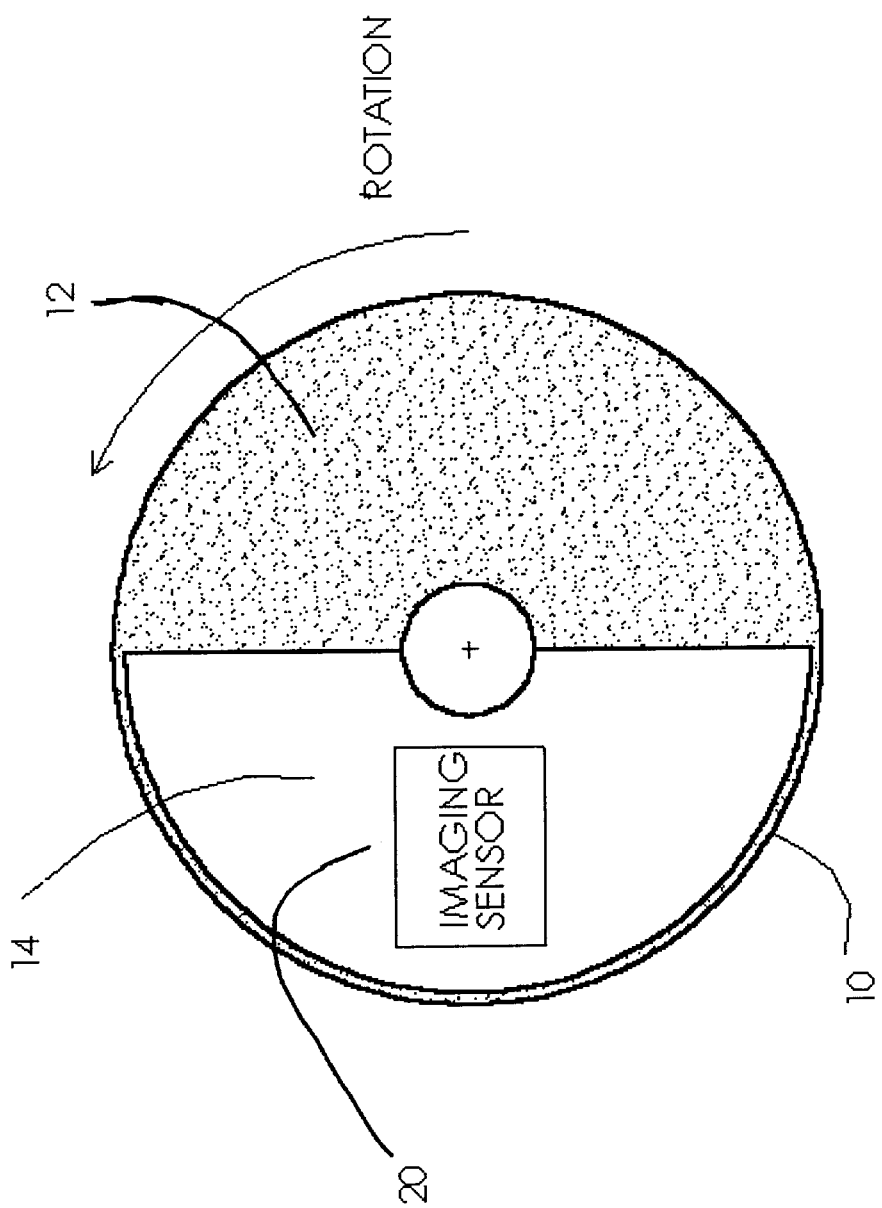
FIG. 1 shows a front view of one of the discs utilized in the present invention.

FIG. 1 shows a front view of the disc 10 including a solid portion 12 and an open portion 14. Although the solid portion 12 of the disc 10 shown in FIG. 1 extends for approximately ½ the potential surface area of the disc, this need not be the case as will be illustrated with respect to FIGS. 3 and 4. Although FIG. 1 is meant to illustrate only a single disc, it can be appreciated that if a second disc having an equal diameter as the first disc is placed behind disc 10 and both the blackened portions 12 of each disc were aligned and rotate in synchronism, the resulting output in front of the imaging sensor 20 would be that as shown in FIG. 1. However, if the blackened portion 12 of the second disc were offset by a certain angle, such as 20°, the output created by the rotating discs would also include a blackened area 16 as received by the imaging sensor 18 in addition to the blackened solid area 12.

Figure 2:
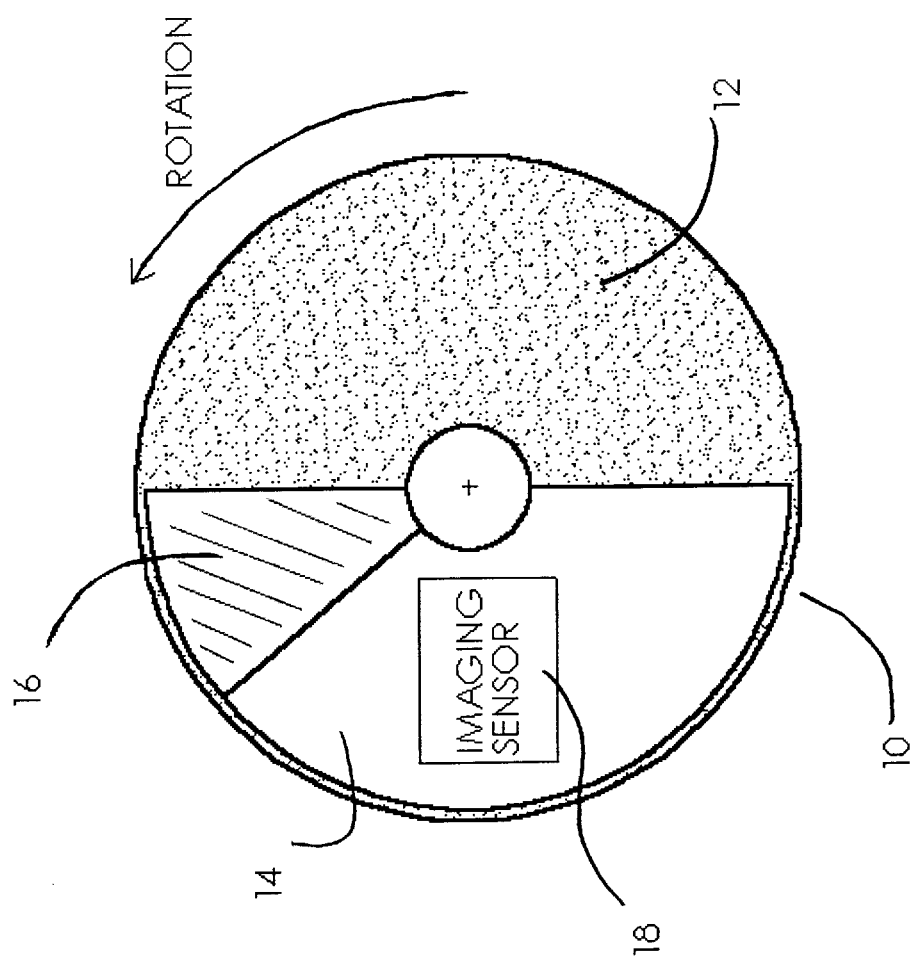
FIG. 2 shows a front view showing the output produced by two non-aligned discs.
Figure 3:
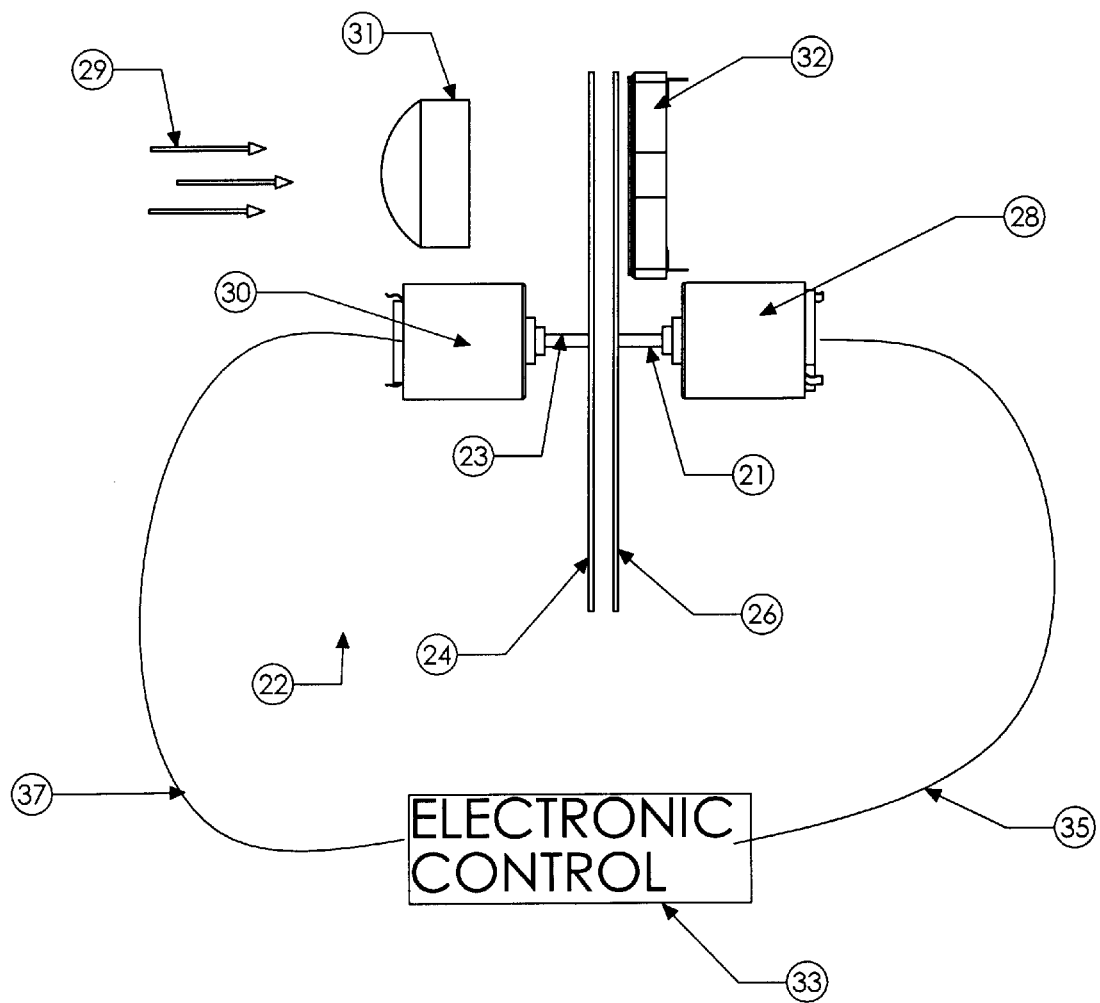
FIG. 3 shows a side view of the system of the present invention.

The entire system of the present invention 22 is illustrated in FIG. 3. This system includes rotating discs 24 and 26. A first motor 28 is used to rotate the disc 26 and a second motor 30 is used to rotate the disc 24. An image sensor 32, such as an infrared sensor, is also provided. Radiation 29 will pass through an objective lens 31, the open area of the discs as they rotate and will be received by the sensor 32. The two motors 28, 30 are controlled so that the rotation of both of the discs (or chopper blades) 24, 26 is in synchronism (i.e., both discs rotate at the same speed). Motor 30 is connected to a rotating axle 23 which in turn is connected to the rotating disc 24. Similarly, motor 28 is connected to a rotating axle 21 which in turn is connected to the rotating disc 26. The net chopper blade opening (phase) is set to a position that corresponds to a particular desired gain/attenuation factor. If the motors are controlled so the openings of both chopper blades coincide precisely, as can be seen in FIG. 1, when both of the disc are provided behind one another, the maximum sensitivity will be achieved. Alternatively, if the motors are adjusted so the opening of one of the discs overlaps minimally to the opening of the second disc, the lowest sensitivity will be achieved. It is noted that the configuration illustrated in FIG. 2 shows a sensitivity between the maximum and the minimum.

Although FIG. 3 shows the use of an axle connected to each of the chopper wheels to cause rotation thereof, it is noted that one or both of these axles can be eliminated by directly affixing one or both of the motors to its respective disc. Since motors 28, 30 include a stator and a rotor, the rotor of one or both of the motors is directly affixed to its respective disc for the purpose of rotating that disc at the proper speed.

The speed of each of the motors is controlled by an electronic control device 33 connected to each of the two motors by conductors 35, 37. The electronic controller is provided with an input device, such as a keyboard, dial or similar device for inputting the phase difference between the two discs. The phase difference is manifested by having the solid portion of one of the discs offset by a particular angle from the solid portion of the second disc. A lookup table would be provided for altering the speed of rotation of one of the discs for a short period of time to create this offset (as is shown in FIG. 2). Once this offset is provided, the speed of both of the discs will again be made equal. It can be appreciated that this offset can be induced by slowing the speed of either of the discs by alternating the speed of its respective motor, or, alternatively, by increasing the speed of one of the motors for a period of time once the offset is created, the speed of both of the motors will become equal.

Figure 4:
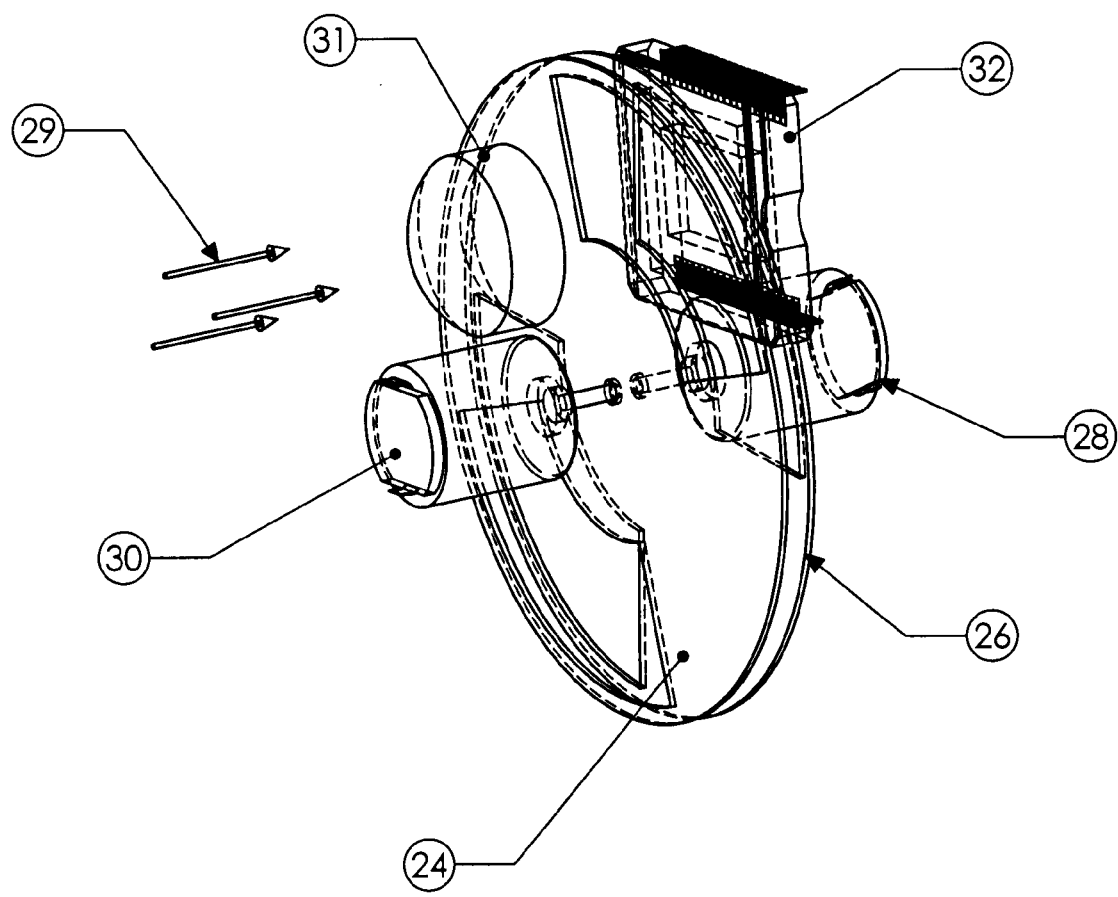
FIG. 4 shows a perspective view of the system of the present invention.

The present invention is further illustrated in FIG. 4 showing a sensitivity level similar to that which is shown in FIG. 2.

The above description of the preferred embodiments, thus details many ways in which the present invention can be used. For example, the blackened or solid area of each of the discs need not be equal to one another. It is therefore apparent that various changes might be made without departing from the scope of the invention, which is set forth in the accompanying claims. Other embodiments of the invention will be apparent to those skilled in the art from a consideration of the invention disclosed herein.

What is claimed is:

1. An apparatus for modulating radiation directed to an imaging sensor, comprising:
    a first disc provided with a first opening;
    a second disc provided with a second opening;
    a first motor connected to said first disc for allowing said first disc to rotate;
    a second motor connected to said second disc for allowing said second disc to rotate; and
    an electronic control device provided with an input device connected to said first motor and said second motor for controlling the speed of rotation of said first disc and said second disc as well as the orientation of said first opening with said second opening to control the modulation of the radiation directed through said first and second openings and received by the imaging sensor when said first disc and said second disc are rotating in synchronization.

2. The apparatus in accordance with claim 1, wherein said first and second disc are rotating perpendicular to the optical axis of the radiation received by the sensor.

3. The apparatus in accordance with claim 2, wherein said first and second discs are rotating close to one another.

4. The apparatus in accordance with claim 1, wherein the size of said first and second openings are equal.

5. The apparatus in accordance with claim 1, wherein the size of said first and second openings are unequal.

6. The apparatus in accordance with claim 1, further including an objective lens in front of said first and second discs.

7. The apparatus in accordance with claim 1, wherein said first motor is connected to said first disc by a first axle.

8. The apparatus in accordance with claim 7, wherein said second motor is connected to said second disc by a second axle.

9. The apparatus in accordance with claim 1, wherein said first motor includes a first rotor directly affixed to said first disc.

10. The apparatus in accordance with claim 9, wherein said second motor includes a second rotor directly affixed to said second disc.

11. A method for modulating radiation directed to an imaging sensor, comprising the steps of:
    rotating a first disc provided with a first opening at first speed;
    rotating a second disc provided with a second opening at said first speed;
    changing the offset position of said first opening with respect to said second opening, thereby changing the gain/attenuation of the imaging sensor, by rotating said first and second discs at the same speeds, slowing the speed of either said first or second disc for a period of time to change said offset position;

changing the speed produced in said preceding step to ensure that both said first and second discs are again rotating at the same speed; and allowing radiation to be directed at said rotating first and second discs, said radiation impinging upon the sensor only where at least a portion of said first and second openings are aligned with one another.

12. A method for modulating radiation directed to an imaging sensor, comprising the steps of:

rotating a first disc provided with a first opening and a first speed;

rotating a second disc provided with a second opening at said first speed;

changing the offset position of said first opening with respect to said second opening, thereby changing the gain/attenuation of the imaging sensor, by rotating said first and second discs at the same speed;

increasing the speed of either said first or second disc for a period of time to change said offset position; and changing the speed produced in said preceding step to ensure that both said first and second discs are again rotating at the same speed.

* * * * *